(12) United States Patent
Yen

(10) Patent No.: US 6,758,633 B2
(45) Date of Patent: Jul. 6, 2004

(54) IN-SITU PROCESS FOR DETOXIFYING HEXAVALENT CHROMIUM IN SOIL AND GROUNDWATER

(75) Inventor: Chen-Yu Yen, Phoenix, MD (US)

(73) Assignee: Gannett Fleming, Inc., Baltimore, MD (US)

( * ) Notice: Subject to any disclaimer, the term of this patent is extended or adjusted under 35 U.S.C. 154(b) by 0 days.

(21) Appl. No.: 10/235,984

(22) Filed: Sep. 5, 2002

(65) Prior Publication Data

US 2003/0073877 A1 Apr. 17, 2003

Related U.S. Application Data

(60) Provisional application No. 60/317,786, filed on Sep. 6, 2001.

(51) Int. Cl.[7] .................................................. B09C 1/02
(52) U.S. Cl. ............................. 405/128.5; 405/128.75
(58) Field of Search .................... 405/128.1, 128.45, 405/128.5, 128.7, 128.75, 128.25, 128.3; 210/747

(56) References Cited

U.S. PATENT DOCUMENTS

| | | |
|---|---|---|
| 1,932,531 A | 10/1933 | Parker et al. |
| 4,354,942 A | 10/1982 | Kaczur et al. |
| 4,435,292 A | 3/1984 | Kirk et al. |
| 4,504,321 A | 3/1985 | Kapland et al. |
| 4,526,615 A | 7/1985 | Johnson |
| 4,981,393 A | 1/1991 | van de Velde et al. |
| 5,000,859 A | 3/1991 | Suciu et al. |
| 5,162,600 A * | 11/1992 | Cody et al. ............... 588/236 |
| 5,285,000 A | 2/1994 | Schwitzgebel |
| 5,304,710 A | 4/1994 | Kigel et al. |
| 5,368,632 A | 11/1994 | Rajeshwar et al. |
| 5,380,441 A | 1/1995 | Thornton |
| 5,389,262 A | 2/1995 | Guess |
| 5,397,478 A | 3/1995 | Pal et al. |
| 5,398,756 A | 3/1995 | Brodsky et al. |
| 5,427,692 A | 6/1995 | Thornton |
| 5,431,825 A | 7/1995 | Diel |
| 5,545,801 A | 8/1996 | Fulton |
| 5,563,066 A | 10/1996 | Buchanan |
| 5,569,596 A | 10/1996 | Caccavo, Jr. et al. |
| 5,681,739 A | 10/1997 | Turick et al. |
| 5,928,406 A | 7/1999 | Salt et al. |
| 5,951,457 A | 9/1999 | James |
| 5,967,965 A | 10/1999 | Vyshkina et al. |
| 6,020,185 A | 2/2000 | Hince et al. |

OTHER PUBLICATIONS

EPA SW 846 Methods for the Analysis for Hexavalent Chromium in Water Samples (Methods 7195, 7196 and 7197 (20 pages) (Sep. 1986).

* cited by examiner

*Primary Examiner*—John Kreck
(74) *Attorney, Agent, or Firm*—Akin Gump Strauss Hauer & Feld, LLP

(57) ABSTRACT

Inexpensive, highly effective methods for the in-situ reduction of hexavalent chromium to the non-toxic trivalent oxidation state in soil and groundwater containing hexavalent chromium are provided, which may reduce hexavalent chromium concentration in soil to as low as 5 mg/L. The methods involve sampling soil comprising hexavalent chromium to determine a reaction amount of a reducing agent, providing a frame on a top surface of the soil, wetting the soil, spreading a reducing agent on the top surface of the soil, and flushing the soil with water to dissolve the reducing agent. The reducing agent may be a chemical agent, a biological agent, or a combination of chemical and biological agents. The biological reducing agents may include sludge from wastewater, return activated sludge, waste activated sludge, leachate from landfill or from composting operations, or compost material from municipal wastewater, industrial wastewater, or solid waste operations.

42 Claims, 2 Drawing Sheets

IN-SITU PROCESS FOR DETOXIFYING HEXAVALENT CHROMIUM IN SOIL AND GROUNDWATER

CROSS-REFERENCE TO RELATED APPLICATIONS

This application claims the benefit of U.S. Provisional Application No. 60/317,786, filed Sep. 6, 2001.

BACKGROUND OF THE INVENTION

Chromium-containing soils and tailings are significant environmental problems in many parts of the United States and around the world. Chromium compounds are used in metal cleaning, preplating and electroplating, as well as in the manufacture of inks, paint pigments and dyes. The chromium contamination is also a result of chromite ore processing, which generated large volumes of tailings and residues that have high concentrations of hexavalent chromium (Cr(VI)). These tailings and residues have been deposited as fill materials in many locations in and near the chromium manufacturing sites. As hexavalent chromium is a Class-A human carcinogen through inhalation, detoxification of these wastes will result in reduced human health risks and allow for future land use at or near known contaminated sites.

The United States Environmental Protection Agency (EPA) has established testing criteria for determining acceptable levels of chromium in the soil. In 1990, it was specifically established as part of the Resource Conservation and Recovery Act (RCRA) that the total chromium concentration in the leachate of the soil must fall below the standard Toxicity Characteristic Leaching Procedure (TCLP) limit of 5 mg/L in order for the soil to be no longer characterized as "hazardous waste." Additionally, the groundwater chromium concentration level is regulated. Currently, the maximum contamination level (MCL) for total chromium is 100 ppb (parts per billion) or micrograms/liter. The California Department of Health Services (CDHS), however, disagrees with EPA on the toxicity of chromium and has set the State MCL to be 50 ppb and is proposing to regulate the groundwater hexavalent chromium at 0.2 ppb and total chromium at 2.5 ppb. These newer, more stringent levels are being considered to become effective in 2004 in California.

Brownfields, or pre-used urban industrial sites, are a type of location which may be contaminated with hexavalent chromium. If properly assessed or cleaned up, such sites could be reused for industrial purposes, which is desirable over utilizing new clean, suburban sites (greenfields) for similar purposes. Many brownfields are being cleaned up based on the calculated risks associated with various exposure scenarios. Typically, these are based on state laws or regulations rather than on federal laws or regulations. According to the most recent EPA Region III risk based criteria (RBC) guidelines, which were issued in April, 2000, the screening concentration for hexavalent chromium is 6,100 mg/Kg for industrial sites, 230 mg/Kg for residential areas, and $1.5 \times 10^{-4}$ µg/m$^3$ in ambient air. The cleanup targets for brownfields are often based on these less stringent cleanup standards based on hexavalent chromium concentration.

The most feasible method for the detoxification of hexavalent chromium is via the well-known reduction to trivalent chromium, Cr(III). Unlike Cr(VI), which is highly soluble, Cr(III) is not a human carcinogen and is typically found in insoluble forms in the environment. Cr(III) thus represents a lesser health concern than Cr(VI).

The reactions for the reduction of hexavalent chromium to trivalent chromium in aqueous solution are known. In addition, there are varying methods in the prior art to attempt to treat and stabilize chromium ore waste, which typically include the use of biological or chemical reduction. Bioremediation processes facilitate the reduction of Cr(VI) to Cr(III) through the use of anaerobic bacteria, whereas chemical reduction methods involve the addition of reducing agents and other reagents to the soil or material to be detoxified.

Many known processes designed for the reduction of Cr(VI) in soil and other waste materials are known as ex-situ methods, in which the soil must be excavated and fed through a reactor or apparatus for treatment. In a typical ex-situ process, such as that disclosed by U.S. Pat. No. 5,304,710, the soil, once excavated, is placed in a reactor and ground. The pH of the soil is then adjusted to an appropriate level and combined with a reduction agent, typically ferrous sulfate, to reduce the hexavalent chromium. Assuming that ferrous sulfate is used as the reducing agent, the following redox reaction applies:

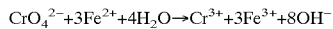

$$CrO_4^{2-} + 3Fe^{2+} + 4H_2O \rightarrow Cr^{3+} + 3Fe^{3+} + 8OH^-$$

Following reduction, further treatments, such as neutralization, may be performed on the soil. The drawbacks generally of ex-situ processing methods are that large reactors must be constructed and the soil to be treated must be excavated and transported to the reactor for treatment, processes which are not efficient on a large scale and can be very costly and hazardous with respect to the transfer of contaminated materials.

In-situ methods of soil detoxification are more practical, cost effective and safer, especially when large areas of land must be treated. In this type of approach, one or more reagents are added to the soil (e.g., in the field) to bring about the reduction. Clear advantages are the elimination of both the reactor and the need for excavation. One such method is disclosed by U.S. Pat. No. 5,951,457 and involves the addition of ascorbic acid to the soil to reduce the Cr(VI) to Cr(III). In order to ensure that the chromium in the soil below the ground level is reduced, the soil must be mechanically mixed with the ascorbic acid. Although this method is designed to treat soil significantly below the ground level, extremely large quantities of the acid are necessary. As a result, the process is not economically feasible on a large scale due to the high costs of purchasing and transporting large quantities of ascorbic acid.

Other methods have been proposed for the addition of chemical reducing agents to the soil. These include (1) first drilling holes in the ground prior to introducing the reagent; and (2) utilizing a rototiller or similar device to thoroughly mix the soil with the reducing agent. One such method, directed toward the reduction of Cr(VI), is described in U.S. Pat. No. 5,285,000. However, delivery methods designed to inject solutions into soil are typically not effective methods of delivery because they do not typically provide even distribution of the reagent to the targeted contaminants. Additionally, the process involves dissolving and mixing ferrous and ferric salts in large quantities of water to produce the reducing solutions, which is likely to be quite costly.

A further such method in U.S. Pat. No. 5,397,478 is directed to the in-situ reduction of Cr(VI) in soil. This patent demonstrates the use of hole-drilling only on a very small test plot of soil in a laboratory. It does not provide guidance on how to feasibly implement such techniques practically on a large land area, in which the depth of the soil is significant, and/or in which large volumes of soil would be required to be mixed with or otherwise contacted with the reducing agents.

Bioremediation processes can also be performed in-situ. One such process, described in U.S. Pat. No. 5,681,639, involves stimulating the growth of indigenous anaerobic Cr(VI) reducing bacteria in the contaminated soil and/or groundwater by adding a nutrient medium to the soil and maintaining a substantially anaerobic environment. Such nutrients may be carbohydrates, amino acids, organic acids or nitrogen sources. However, no reliable means of controlling the biological reaction is described.

Even in view of the above described methods, there remains a need in the art for a method of in-situ soil remediation which is workable, safe, controllable, effective, and economically feasible and which can be applied on a large scale. There is a further need for an environmentally compatible process which is able to achieve soil chromium concentration levels below the TCLP limit and groundwater chromium concentration below regulatory levels, using inexpensive, easily available reagents and without the need for excavation or mixing of enormous volumes of soil with the applicable chemical reagents.

BRIEF SUMMARY OF THE INVENTION

This invention relates to a method for the in-situ reduction of hexavalent chromium to trivalent chromium in soil comprising hexavalent chromium. The method comprises sampling soil comprising hexavalent chromium to determine a reaction amount of a reducing agent, providing a frame on a top surface of the soil, and wetting the soil. The method further comprises spreading a reducing agent on the top surface of the soil and flushing the soil with water to dissolve the reducing agent.

This invention also relates to a method for the in-situ reduction of hexavalent chromium to trivalent chromium in soil comprising hexavalent chromium in a hydraulically isolated area. The method comprises sampling soil comprising hexavalent chromium to determine a reaction amount of a reducing agent, providing a frame on a top surface of the soil, and wetting the soil. The method further comprises spreading a reducing agent on the top surface of the soil, flushing the soil with water to dissolve the reducing agent, pumping water comprising the reducing agent from an aquifer below the soil and applying the pumped water to the soil.

This invention also relates to a method for the in-situ reduction of hexavalent chromium to trivalent chromium in soil comprising hexavalent chromium in a hydraulically isolated area wherein the area comprises a contaminated waste product selected from the group consisting of return activated sludge and waste activated sludge. The method comprises sampling soil comprising hexavalent chromium to determine a reaction amount of a reducing agent, calculating a reduction power of the contaminated waste product, providing a frame on a top surface of the soil, and wetting the soil. The method further comprises pumping water comprising the contaminated waste product from an aquifer below the soil and applying the pumped water to the soil.

This invention includes a method for the in-situ reduction of hexavalent chromium to trivalent chromium in groundwater comprising hexavalent chromium. The method comprises sampling groundwater comprising hexavalent chromium to determine a reaction amount of a reducing agent, providing a frame on a top surface of the soil and providing a recovery well and a circulating means on a down gradient side of the frame. The method further comprises wetting the soil, spreading a reducing agent on the top surface of the soil, flushing the soil with water to dissolve the reducing agent, and pumping water comprising the reducing agent from the recovery well below the soil and applying the pumped water to the soil.

A further method provided by this invention is a method for the in-situ reduction of hexavalent chromium to trivalent chromium in soil comprising hexavalent chromium. The method comprises sampling soil comprising hexavalent chromium to determine a reaction amount of a reducing agent, providing a frame on a top surface of the soil and providing a recovery well and a circulating means on a down gradient side of the frame. The method further comprises wetting the soil, spreading a reducing agent on the top surface of the soil, flushing the soil with water to dissolve the reducing agent, and pumping water comprising the reducing agent from the recovery well below the soil and applying the pumped water to the soil.

A further method provided by this invention is for the in-situ reduction of hexavalent chromium to trivalent chromium in soil comprising hexavalent chromium. The method comprises sampling soil comprising hexavalent chromium to determine a reaction amount of a reducing agent, wetting the soil, spreading a reducing agent on a top surface of the soil, flushing the soil with water to dissolve the reducing agent, and covering the top surface of the soil with a layer of clean soil free of hexavalent chromium.

In addition, this invention includes a system for the in-situ reduction of hexavalent chromium in soil comprising hexavalent chromium. The system comprises a frame open at a top and a bottom configured to retain water and a reaction amount of a reducing agent capable of reducing hexavalent chromium to trivalent chromium, a hose positioned with respect to the frame such that water can be provided through the top and bottom of the frame, a spreader capable of delivering a reaction amount of a reducing agent to the frame, and a water source.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
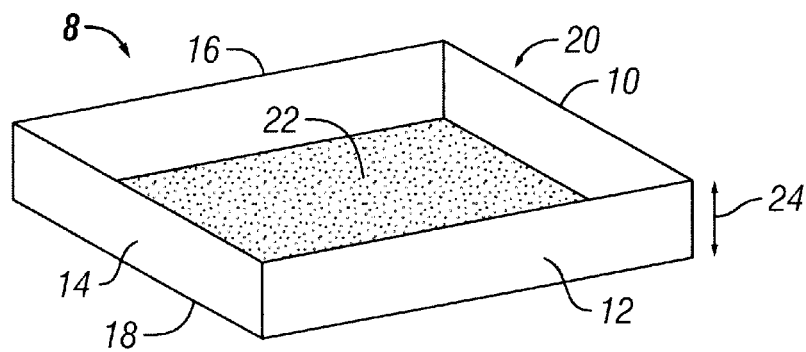
FIG. 1 is a perspective view of a schematic representation of a frame for use in the invention.

The present invention includes methods for the in-situ reduction of hexavalent chromium (Cr(VI)) to trivalent chromium (Cr(III)) in soil including Cr(VI). The methods provide for the detoxification of soils, such as tailings, or other similar materials contaminated with hexavalent chromium by reducing the Cr(VI) to the non-toxic Cr(III) oxidation state. As these are in-situ processes, the methods involve the treatment of the contaminated soil in the field, without the need for excavating the soil and feeding it through a complicated apparatus or reactor for combination with the reducing agent. Furthermore, a benefit of the methods of the invention is that no mechanical mixing of the soil with the reducing agent is required. The methods are designed to be applicable to both small and large areas of land, including those which are contaminated as a result of chromite ore processing or other manufacturing processes which utilize chromium. In addition, the invention provides a method for the in-situ reduction of hexavalent chromium in groundwater which includes Cr(VI). The invention also includes a system for in-situ reduction of Cr(VI) in soil contaminated with Cr(VI) as described further below. As used herein, "soil" includes soil, sediment, clay, sand, silt, sludge, residue, tailings and any other earth-containing or granular material.

The methods provided by this invention are an environmentally compatible technology for the in-situ remediation of soils, including tailings, having penetrability higher than about $1 \times 10^{-5}$ cm/sec. The processes provide ways to reduce chromium concentration in soils, including tailings, to below the TCLP limit of 5 mg/L and to reduce the groundwater Cr(VI) concentration to below regulatory levels.

The reduction of Cr(VI) to Cr(III) in soil to be treated may be accomplished by the use of a chemical reducing agent, a biological reducing agent, or a combination of chemical and biological reducing agents, depending on the site conditions. In the first and second cases, the processes are "purely chemical" or "purely biological," whereas in the third case, the methods may be characterized as "chemically assisted biological processes."

The chemical reducing agent to be used in the methods may be used in a variety of forms. Preferred forms include solution, powder, or granular form. In a preferred embodiment, the reducing agent is a powder or a granulate with an average particle size of less than about 5 mm in diameter and, more preferably, less than about 1 mm in diameter, wherein diameter is measured in the longest dimension of the particulate or granulate. The reducing agent may be any reducing agent, preferably effective in the presence of water, which can effectively reduce Cr(VI) to Cr(III). Preferably, the reducing agent is one or more of a ferrous salt such as ferrous sulfate, ferrous sulfite, ferrous chloride and similar materials; a sulfide salt such as sodium sulfide, potassium sulfide and similar sulfides; sodium thiosulfate; sodium benzoate; and/or an organic reducing agent such as citric acid, methanol, ethanol, formaldehyde, and/or similar materials. The most preferred chemical reducing agent for the present methods, ferrous sulfate, provides economic and environmental advantages. Specifically, ferrous sulfate does not contribute to secondary water contamination, and does not require regulatory agency approval for its utilization in the environment.

When the process for reducing hexavalent chromium is purely chemical, the overall reaction for the reduction of dichromate ions by ferrous species can be represented by the equation:

$$Cr_2O_7^{2-}+6Fe^{2+}+7H_2O \rightarrow 2Cr^{3+}+6Fe^{3+}+14OH^- \qquad (I)$$

Although this equation proceeds rapidly at acidic pH (lower than about 4), it is not likely the dominant equation at neutral or alkaline conditions when chromate is the dominant species of hexavalent chromium. Because the reduction proceeds under highly acidic conditions, it may be necessary to titrate the pH of the soil back to neutral levels after the reduction is complete by using a base such as calcium oxide, calcium hydroxide, sodium hydroxide, sodium carbonate, or sodium bicarbonate, for example. The purely chemical reduction process is the preferred method for hexavalent chromium reduction when the contaminated site to be treated is small. Depending on the particular site conditions, it may not be feasible to utilize a purely chemical process.

In such cases, the detoxification may be accomplished via purely biological or chemically assisted biological reduction. One embodiment of this invention thus involves the use of recyclable sludge from waste water operations as a source for the reducing agent. As used herein, the term "sludge" encompasses materials such as, but not limited to, return activated sludge (RAS), waste activated sludge (WAS), and leachate from landfills or from composting operations. In such cases, the reducing agents are biological instead of or in addition to chemical. The benefit to utilizing recyclable sludge is the extremely reduced cost of site remediation. In particular, because the reducing agent may be used multiple times for enhancing soil flushing, if necessary, the amount of overdose of reducing agent may be significantly reduced (as discussed below).

In purely biological or chemically assisted biological reductions, the primary reducing agents are anaerobic or anoxic bacteria. When the cells are deprived of oxygen, they will be forced to find an alternate source for growth. By choosing $Cr^{6+}$ as an oxygen source, the chromium is simultaneously reduced to the trivalent oxidation state. Without wishing to be bound by theory, it has been proposed that the biological reduction of $Cr^{6+}$ to $Cr^{3+}$ may be explained by the exemplary redox reaction shown in Formula II. The cellular material is generally represented by the formula $(CH_2O)$, and the reduction of chromium from the chromate species results in the formation of trivalent chromium, hydroxide ions and carbon dioxide.

$$4CrO_4^{2-}+3CH_2O+7H_2O \rightarrow 4Cr^{3+}+3CO_2+20OH^- \qquad (II)$$

Although this method relies predominantly on bacterial reduction, a chemical reducing agent is also employed in a preferred embodiment in order to hold the oxidation state and thus maintain an anaerobic or anoxic environment. The ideal pH for the chemically assisted biological reduction is preferably about 7, but it is also effective at slightly alkaline pH levels above 7. Although the reduction will occur at acidic pH levels, the resulting trivalent chromium will remain in solution. It is only under neutral or slightly alkaline pH that the chromium can be "fixed," or precipitated out of solution as, for example, chromium oxide or chromium hydroxide. Because waste activated sludge is at approximately neutral pH, it is itself a desirable reducing agent because it maintains a stable pH level.

The methods of the present invention involve initially sampling and analyzing representative portions of soil which require treatment. Several characteristics of the soil are preferably determined or calculated to ensure effective treatment and remediation and to determine the amount of reducing agent needed. Two such preferred characteristics are the measurement of the void space (the porosity) of the sample portion of unsaturated soil and the total volume of the soil to be treated. These measurements are useful for calculation of the volume of water which is preferably employed to substantially and preferably completely fill the void space. Specifically, the volume of water desired to fill the void space may be determined to be approximately equal to the volume of soil multiplied by the percentage of void space. Typically, the porosity of the soil is about 30 volume percent to about 50 volume percent, but may be greater or lower without affecting significantly the operation of the invention.

It is preferred to also measure the concentrations of total chromium and hexavalent chromium in the soil samples. The difference between these values is assumed for calculation purposes to be trivalent chromium. Using the hexavalent chromium concentration and the total volume of the soil to be treated, the theoretical reduction demand can be calculated according to the dominant redox equation for the particular reducing agent to be used. For example, the dominant redox equation for ferrous species is Equation (I). As shown in Equation (I), for each mole of Cr(VI) to be treated, the theoretical reduction demand is three moles of ferrous sulfate.

The reaction amount of reducing agent needed for the in situ reduction is calculated based on the theoretical reduction demand. Preferably, the reaction amount represents an overdose of about two to about ten times the theoretical reduction demand, in order to provide a safety factor of design. Such a safety factor compensates for uncertainty of sampling and analysis, delivery inefficiency, and any incomplete reactions to the extent such factors may have an effect. As will be described in further detail below, reduction may be accomplished by a reducing agent which is either a chemical reducing agent alone, a biological reducing agent alone, or such a chemical reducing agent in combination with such a biological agent, depending on the reaction amount determined and the site conditions.

In a preferred embodiment of this invention, the pH level of the soil is also measured from the sampled soil to determine if the pH level of the soil is in an optimal range or if it would be preferable to add an activation agent to attain a preferred pH level for a desired reaction rate. As explained previously, the ideal pH level for chemically assisted biological reduction is about 7, or slightly above. In contrast, the ideal pH level for a purely chemical reduction process is below about 7, and more preferably, below about 4. Based on the pH level of the soil, it may be desirable to calculate an amount of activation agent for raising or lowering the pH of the soil to the desired level.

Preferably in the methods prior to treating with the reducing agent, the soil is prepared. This preparation preferably involves tilling approximately fifteen cm of the top soil using a rototiller or similar device and leveling the soil to produce a generally smooth and/or graded surface. Although a rototiller is used in a preferred embodiment, the tilling of the ground can be performed by any similar machine known in the art, or by manual means. The mechanism or technique of leveling the soil or otherwise preparing the soil is not critical to the methods and may be performed using any machine or device known in the art. However, automated or mechanical methods are preferred for time and efficiency reasons. Even if the surface of the soil is not contaminated, preparation of the surface is preferred to allow for more even distribution of the reagents, which contributes to optimum efficiency and use of the reducing and activating agents.

At least one frame is built on a top surface of the prepared soil preferably after preparing the soil as discussed above. A frame can be generally any shape in transverse cross-sectional view, such as generally circular, oval, square, triangular, rectangular, or other irregular shape. However, the frame preferably is generally square or rectangular with four sides for simplicity of construction. As can be seen more clearly by examining FIGS. 1 and 2A, a preferred frame is shown and generally referred to herein as frame 8, which has four sides 10, 12, 14 and 16, which are preferably arranged to be perpendicular to one another and to the surface of the ground to create a generally rectangular structure which extends vertically upwardly from the top surface of the soil. The top 20 of the frame 8 and the bottom 18 of the frame are preferably open to the environment and soil to allow free flow of water for flushing. The bottom 18 preferably lies generally against the top surface 22 of the soil 30. The sides of the frame may be constructed of any suitably rigid material capable of retaining the reducing agent and water required to effect the method. Examples of such materials are metals, plastics, polymers and woods. In a preferred embodiment, the material for the frame is any type of wood, and it is most preferred if the sides may be constructed of an inexpensive lumber or plywood. The sides of the frame may be any shape such as generally tubular or generally rectangular parallelepiped, but it is preferred if the sides are generally rectangular when viewed in the transverse cross section of the side and when viewed in longitudinal cross section of the side. A frame may be constructed of multiple pieces or may comprise a single piece. It is preferred that the frame is constructed of more than one piece and more preferred if it is constructed of about four pieces for ease in construction. If the frame is constructed of more than one piece of material, the pieces may be connected to one another by any commonly known method of joining materials, such as adhesives, welding, screws, nails or other hardware or connecting device. The particular means of joining the pieces of the frame may be determined depending on the length of time during which the frame will be in use in a particular situation.

The size of the frame depends on the size of the area and the terrain to be treated, but in a typical frame, each of the four sides measures about 2 m to about 50 m when measured longitudinally. More preferably, when measured longitudinally, the sides measure about 5 m to about 20 m. The opposite sides 12 and 16 of the preferred frame 8 as well as sides 10 and 14 are preferably identical in length, but need not be the same length as the adjacent side. The purpose of the frame is to serve as a biological and/or chemical reactor and to hold the requisite amounts of reaction and activation reagent(s) and the water to be flushed through the soil.

The height 24 of the frame 8 may be calculated based on the reaction amount of reagent to be added. The depth of the reducing agent may be calculated by dividing the total volume of the reducing and activation agents (calculated as described above) by the surface area of soil to be treated. For example, if the surface area of the soil is 10 m×10 m (100 m$^2$) and 15 m$^3$ of reducing agent (without additional activation agent) are needed, the estimated depth of the reagent would be (15 m$^3$/100 m$^2$)=0.15 m (15 cm). The height of the frame should preferably be somewhat greater than the height of the reducing and activation agents to accommodate additional volumes of water. In a preferred embodiment, the frame is at least about 30% to about 60% higher and preferably about 10 cm to about 20 cm higher than the calculated height of the reducing and activation agents. For example, if the calculated depth of reducing and activation agents is 10 cm, a frame between about 20 cm and about 30 cm high would be preferred.

Figure 2B:
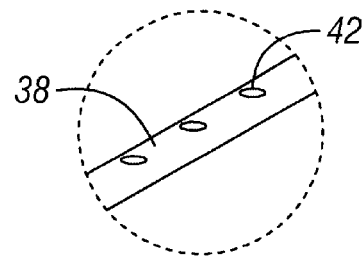
FIG. 2B is an enlarged section of a hose in FIG. 2A.
Figure 2A:
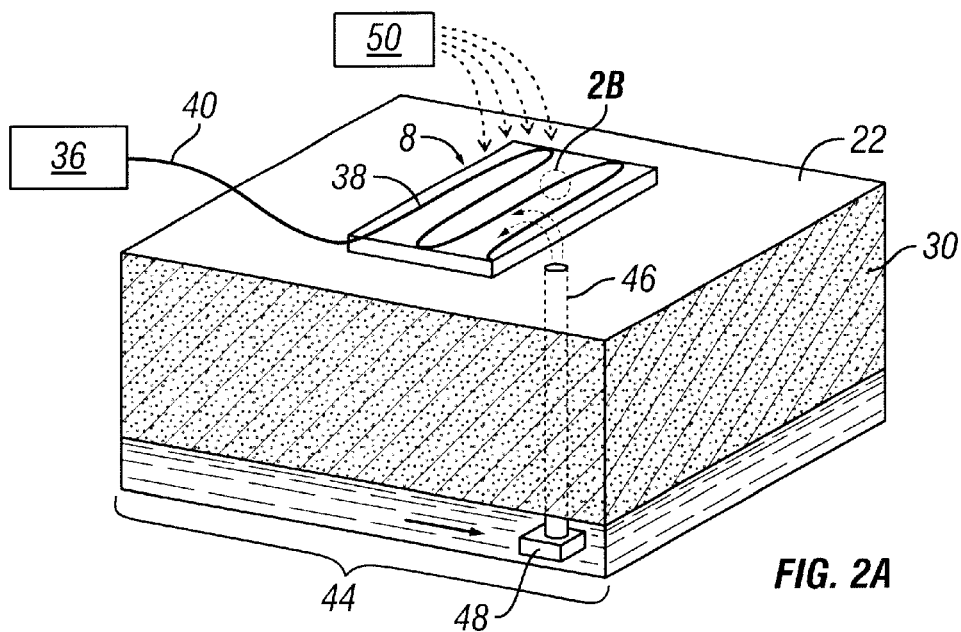
FIG. 2A is a cross-sectional representative view of a frame and water source in position on soil for treatment.
Figure 3:
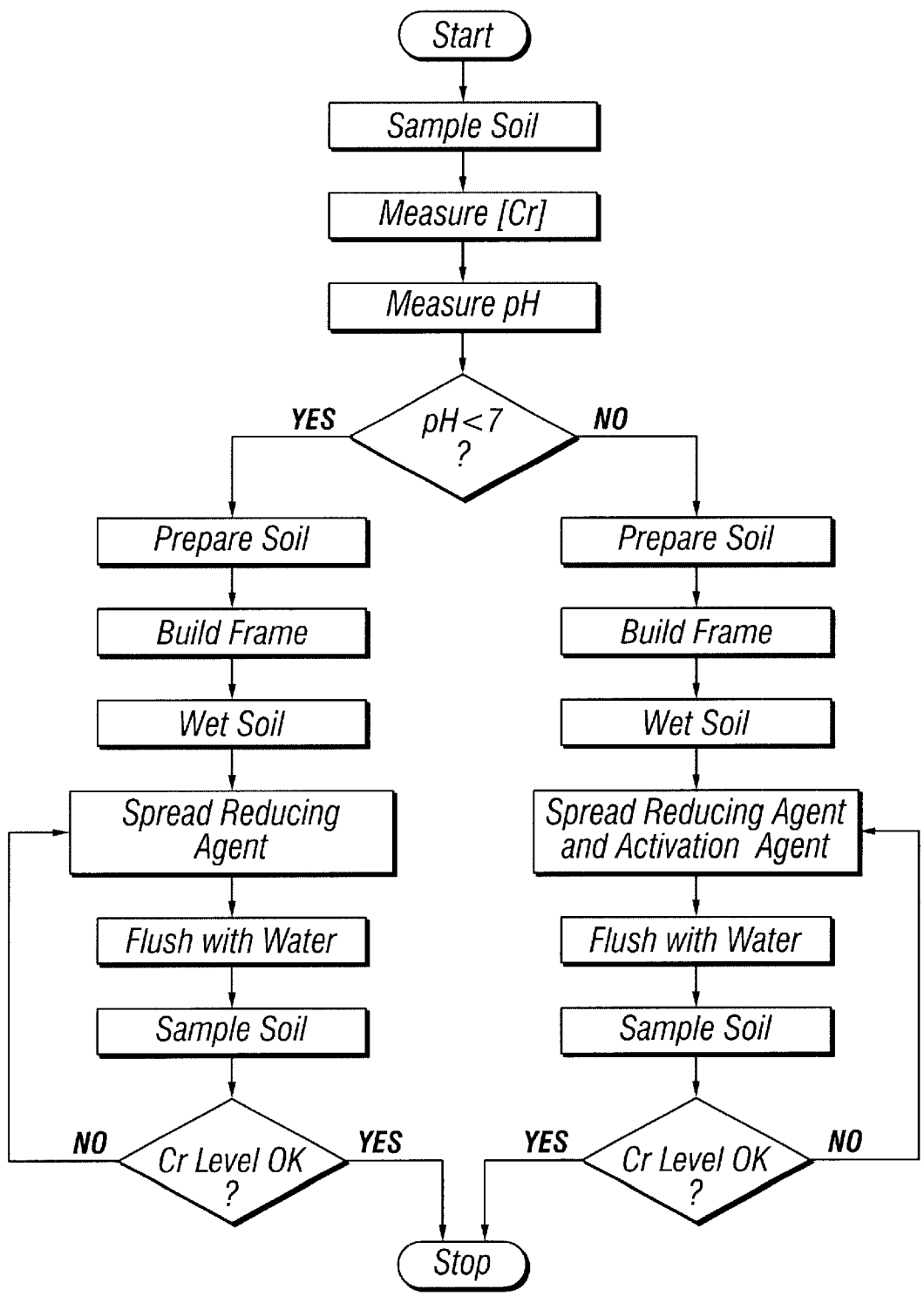
FIG. 3 is a diagrammable view of an embodiment of the method of the invention.

In one embodiment, as shown in FIG. 2A, at least one recovery well 46 is installed on the down gradient side 44 of the frame. By "down gradient" is meant the lowest level of water flow. In FIG. 2A, the direction of water flow is indicated by a solid arrow. At least one pump 48 or other circulating means is installed at the bottom of the recovery well 46. As will be explained in further detail below, the combination of the pump and the recovery well allows water to be pumped back up into the frame and recirculated. The direction of pumped water flow is designated by the dotted arrows in FIG. 2A.

The chemical reducing agent used in the methods may be in a liquid or a solid form; solid reducing agents may be either in a powder or a granular form. In some cases, the reducing agent may be commonly obtained in solution, such as, for example, waste pickle liquor from steel production or metal finishing and molasses. In such cases, a stock solution may be prepared by dissolving the reducing agent in solution at a desired pH level, depending on the particular reducing agent, so that the reducing agent is not reactive in air to avoid loss of potency. In a preferred embodiment, the reducing agent is a solid and thus no additional preparation before use is necessary. The use of a solid reducing agent thus eliminates the necessity of preparing and subsequently diluting a stock solution, thereby reducing cost and time required for such a step and making the process further economical.

As discussed above, it may be desirable when performing a purely chemical reduction to add an activation agent to adjust the pH of the soil to a preferred level. Since the reaction between Cr(VI) and ferrous sulfate proceeds faster at lower pH levels, if the soil pH is greater than about 7, it may be desirable to decrease the pH by adding an acidic activation agent. Preferably, if the pH of the soil is greater than about 4, it may be desirable to decrease the pH by adding an acidic activation agent. In some areas, the pH level of contaminated soil may already be below about 7, and preferably below about 4, and thus an activation agent would not be necessary for performing a purely chemical reduction. If an activation agent is added to reduce the pH of the soil to optimal acidic level, it may be necessary to titrate the soil back to neutral levels upon completion of the reduction by adding a base such as calcium oxide, calcium hydroxide, sodium hydroxide, sodium carbonate, or sodium bicarbonate, for example.

In some situations, the site conditions make purely biological or chemically assisted biological reduction more feasible methods. For example, the roasting of chromite ore ($Cr(OH)_3$ or $Cr_2O_3$) under alkaline oxidizing conditions (typically with lime) results in contaminated residues which are highly alkaline due to the use of lime in the roasting process. Hence, typically the tailings in these areas are buffered to the pH of lime, normally about 8.5 to about 9.0. Although the ideal pH for chemically assisted biological reduction is about 7, the reaction will proceed under alkaline conditions as well, and because the pH of the soil is already buffered to alkaline level, a biological reduction would be most practical. In such circumstances, it is preferred to use chemically assisted biological reduction rather than purely biological reduction because the chemical reducing agent holds the oxidation state and maintains an anaerobic or anoxic environment.

If the activation agent is a solid (in either powder or fine granular form), no additional preparation is necessary prior to use. However, if the activation agent is to be added in solution form, a stock solution may be prepared by dissolving the activation agent at a concentration which would achieve the desired pH level in situ. An ideal pH is lower than about 7, but it is preferred if the pH level is lower than about 4.

The activation agents are preferably pH adjusting chemicals (acids or bases) and aqueous solutions of such acids or bases. Commonly used acidic activation reagents include sulfuric acid, hydrochloric acid, nitric acid, and acetic acid. Although organic acids may also be used, inorganic acids are preferred. Commonly used basic activation agents include calcium oxide (lime), calcium hydroxide (hydrated lime), sodium hydroxide (caustic soda), sodium carbonate (soda ash), and sodium bicarbonate (baking soda). These materials are listed as exemplary acids and bases and are not intended to be limiting.

The biological agents which may be used in the methods include, but are not limited to, sludge from wastewater, waste activated sludge (WAS) and compost from municipal or from industrial wastewater and solid waste operations. Preferably, the biological agent is waste activated sludge, which is mixed culture from municipal wastewater treatment plants, operating with selective zone biological nutrient removal (BNR). Such a selective process results in a high population of anoxic and anaerobic bacteria. However, any sludge should have enough mixed culture to be effective as a reducing agent. Although return activated sludge (RAS) may also be utilized, it is typically dilute and contains only about 1 to about 3% solids. In contrast, WAS typically contains about 25 to about 30% solids. Therefore, if the area to be treated is in a location such that the reducing agent must be transported any significant distance, it is preferable to utilize the more concentrated WAS.

Before introducing the reducing agent and activation agent, if any, to the soil, it is preferred that the soil is wet with water to promote better distribution of the reagent(s) through the unsaturated soils. The amount of water to be added is an estimated overdose of the previously calculated total void volume. In a preferred embodiment, water completely fills the void space of the soil. In one preferred embodiment of the invention, a surfactant may be optionally added with the water to enhance the wetting process when a purely chemical process is to be utilized. Suitable surfactants include, without limitation, non-ionic surfactants such as alcohol ethoxylates, alkyl phenol ethoxylates, and lauryl alcohols. Although not preferred, ionic surfactants are also within the scope of this invention. The wetting further opens and widens any pores in the soil, thus allowing the reagents to permeate, and enhancing the effectiveness of the method. Therefore, it is preferred than any surfactant selected be capable of facilitating wetting of the soil without having a significant effect on the reaction.

The wetting may be accomplished by any method known in the art for delivering water to soil, such as, but not limited to, hoses and/or sprinkler systems, which may be mounted on the frame, on poles, on trucks or on similar structures. In a preferred embodiment, the water may be delivered by perforated slow-drip hoses which are arranged above or on the top surface of the soil to promote even water coverage. As shown in FIGS. 2A and 2B, the hose 38 is preferably arranged evenly over the top surface 22 of the soil 30 and connected to a water source 36 for example by a hose 40. The size of the perforated holes 42 and distribution of the perforated holes is not critical, as long as they are sufficiently spaced and large enough to allow for even delivery of the water to the soil. After wetting the soil, the hose 38 is preferably removed from the upper surface of the soil.

If a surfactant is to be used to enhance the wetting process, the surfactant is preferably dissolved in water to make a solution. Such a solution is evenly distributed over the top surface of the soil, preferably by manual spraying or by means of an in-line garden hose sprayer, for example. Other means of applying the surfactant to the soil are also within the scope of the invention.

The activation agent, if added, and the reducing agent are preferably applied to the top or upper surface of the soil within the frame. If the reagent is in solution form, it is preferably applied to the upper surface of the soil using a known irrigation device typically used for delivering chemicals for lawn care. Examples of such devices are a sprinkler system, a hose, a manual spray bottle, and the like. In a preferred embodiment, the reagent is in a solid form and it is spread generally evenly in the frame on the top surface of the soil. The use of a solid reducing agent thus eliminates the necessity of preparing and diluting a stock solution and applying a liquid to the soil.

If the solid reagent is a granulate with a particle size greater than about 3 cm in diameter, it is preferably crushed prior to application to obtain a particle size of preferably less than about 5 mm in diameter, and more preferably less than about 1 mm in diameter, wherein diameter is defined as above. It is preferred that the solid reagents are purchased pre-screened to a desirable size. In such a case a mine or manufacturer of the particular reagent may utilize a pug mill and a screening machine to crush larger particles to a desirable size. Alternatively, a backhoe, front-loader, pulverizer, or any other similar device known in the art may be used for crushing the particles. Crushing may also be accomplished by manual means. Subsequently, a screening machine or other similar device may be used to sieve the crushed particles to a desirable size.

If used in solid form, the activation and reducing agents may be spread on the soil in the frames by any method known in the art for spreading solids on soil. These may include, but are not limited to, automated spreaders which are connected to the top of the frame and which provide even distribution of the reagents, mechanical spreaders and manual spreaders. A spreader 50 is shown in FIG. 2A, which illustrates the solid reducing and/or activation agents being applied to the top surface 22 of the soil 30 in the frame 8. In a preferred embodiment, the reducing agent is loaded onto a truck and dumped onto the top surface of the soil in the frame. Leveling the reagent(s) is generally accomplished by any known method, such as by using an automated truck or other machine or by manual means. In a preferred embodiment, the reducing and activation agents are generally leveled with rakes.

Once the agents have been applied to the soil, the soil is flushed to dissolve the reducing agent and activation agent, if present. The soil may be flushed with water or an acceptable aqueous solution at such a rate as to dissolve the reducing agent and to generally allow all of the reagent(s) to percolate through the soil in about one to about a few days. Any water may be used, including tap water, de-ionized water, distilled water, or mixtures, but tap water is preferred for simplicity and low cost. As discussed previously, the water delivery may be accomplished by any method known in the art. It is preferred that perforated slow drip hoses be arranged above or on the top surface of the reagent(s) in the frame and connected to a water source 36 to promote generally even coverage of the soil to be treated. If the reducing and/or activation agent has been added in solution form, the hose may be laid out directly on the top surface of the soil within the frame. The rate of water delivery may vary depending on whether the reducing agent and activation agent are in solid or liquid form and the solubility of the reducing and activation agents. Since lower permeability soils may not allow water (and therefore the reagents) to percolate through the soil effectively, these procedures are generally applicable to contaminated soil with permeability greater than about $1 \times 10^{-5}$ cm/sec, and preferably greater than about $1 \times 10^{-4}$ cm/sec.

Upon reacting with the reducing agent, the hexavalent chromium is reduced to the trivalent form, which is much less soluble than hexavalent chromium. Immediately after reduction, trivalent chromium will generally be in the form of aqueous trivalent chromium ions $[Cr(H_2O)_6^{3+}]$. In time and under neutral or basic pH conditions, the aqueous trivalent chromium, whether above or below groundwater level, will be transformed to chromic hydroxide $(Cr_2O_3 \cdot nH_2O)$, chromite $(FeCr_2O_4)$, or other stable trivalent chromium minerals. These trivalent chromium minerals are generally not soluble unless either oxidized or treated with acid, and thus represent a lesser health concern than Cr(VI).

In one embodiment of this invention, only a fraction of the reducing agent may be applied in one application. Repeated applications may be performed until the total amount of reducing agent has been delivered over about one to about a few days. The need for repeated application may be determined by factors including the permeability, the depth, and the degree of contamination of the soil to be treated. For example, treatment of more than one day may not be necessary if the soil permeability is greater than about $1 \times 10^{-4}$ cm/sec with less than about 10 m depth and/or hexavalent chromium concentration generally not exceeding about 1,000 mg/Kg.

In a preferred embodiment of this invention, the flushed soil may be re-sampled and re-analyzed to verify the effectiveness of the method based on the amount of hexavalent chromium present in the flushed soil after addition of the reducing agent and flushing with water. The method may be repeated using a similar or a stronger reducing agent if it is determined to be necessary or desired based on the amount of Cr(VI) in the soil after the initial treatment. If the amount of hexavalent chromium is not sufficiently reduced, the method may be repeated until the chromium concentration in the soil is at a desired level, which is preferably no greater than the TCLP limit of 5 mg/L.

In one preferred method of the invention, following the steps described above for re-sampling the soil and determining that the concentration of Cr(VI) is not sufficiently reduced, repeating the treatment of the soil may involve the installation of recovery wells located on the down gradient side of the frame. Pumps or other circulating means are installed beneath the ground so that ground water comprising the unused portion of the reducing agent or unreacted hexavalent chromium solution can be pumped up from the recovery wells and applied to the soil in the frame, thereby affecting a second treatment. When the method for detoxification is purely biological or chemically assisted biological reduction, or when the groundwater is to be treated as well as the soil, as discussed below, it is preferable if the recovery wells are installed so as to allow for recirculation. Following the flushing of the soil, the soil may be sampled to determine the effectiveness of the treatment based on the amount of hexavalent chromium in the treated soil. If the amount of Cr(V) is not sufficiently reduced, the water is preferably recirculated repeatedly until a desired concentration of hexavalent chromium is achieved.

Following treatment of the contaminated area using a purely chemical process, the pH of the soil is preferably readjusted to a desired level if necessary. For example, if the treatment is performed at a pH level of about 4, lime, or any other basic chemical known in the art as previously described, may be added to the soil to raise the pH to a level of about 7. Additionally, it may be desirable following treatment of the soil to redevelop the area, such as by planting grass or trees, for example.

A method according to this invention allows for the in situ reduction of hexavalent chromium to trivalent chromium in groundwater comprising hexavalent chromium. In many contaminated sites, the total chromium concentration in the groundwater is greater than the maximum contamination level (MCL) of 50 ppb, and thus detoxification of the groundwater is required. Sampling of the groundwater to determine a reaction amount of a reducing agent and preferably to determine the concentration of hexavalent chromium may be accomplished, for example, by drilling a hole into the soil and installing permanent wells or by utilizing a direct push process, in which the soil is pushed down with a sampler in order to obtain a water sample in-situ without the need for drilling or pumping. The sample of ground water may be analyzed to determine the concentration of chromium by any method well known in the art. For example, methods of analysis for groundwater are described in EPA SW846 methods 7195, 7196, 7197, and 7198, each of which is incorporated herein by reference for this purpose. The preferred methods, which are the most sensitive, are 7197 and 7195.

Once the groundwater has been treated to determine the reaction amount of reducing agent, the method for reduction of the hexavalent chromium in the groundwater preferably includes steps as described previously, including providing a frame on a top surface of the soil, providing a recovery well and a circulating means on a down gradient side of the frame, and wetting the soil. The reducing agent (and activation agent if desired) is spread on the top surface of the soil, and the soil is flushed with water to dissolve the reducing agent and to allow the reducing agent to preferably percolate through the soil to reach the groundwater. The water comprising the reducing agent may then be pumped from the recovery well below the soil and applied to the top surface of the soil. In one embodiment, the groundwater may be sampled after treatment to determine the effectiveness of the treatment based on an amount of hexavalent chromium present in the groundwater. If the amount of hexavalent chromium concentration is not sufficiently reduced, the steps of the method including wetting the soil, spreading a reducing agent, flushing the soil, and pumping the water from the recovery well, may be repeated, if desired, until the concentration of C(VI) in the groundwater achieves a desired level, such as no greater than 50 ppb in one embodiment.

One embodiment of this invention is for the reduction of hexavalent chromium to trivalent chromium in soil comprising hexavalent chromium in a hydraulically isolated area, such as with, but not limited to, slurry walls or sheet piling. Many contaminated areas, such as those containing contaminated waste products such as RAS and WAS, have been purposefully hydraulically isolated as a means for preventing the contaminants from leaching out into the air, groundwater and adjoining soil areas, rather than attempting to treat the contamination. In such areas, it may be desirable to utilize a recycling and recirculating method in order to detoxify the soil and reduce Cr(IV) to Cr(III). In such situations, chemically assisted biological reduction is the preferred method of treatment, as described above, although purely biological reduction would also be possible in such areas. As previously described, such a method involves sampling the soil, providing a frame on a top surface of the soil, applying a reaction amount of a reducing agent, and flushing the soil with water. After an initial reaction amount of chemical reducing agent has been percolated through the soil, the waste water, which contains unreacted chemical reducing agent, as well as biological reducing agent, may be pumped back from an aquifer below the soil and reapplied to the top surface of the soil via the frame.

Under some circumstances, it may be desirable to perform the reduction of hexavalent chromium as a subsurface operation rather than in frames on the top surface of the soil. Particularly, since biological reduction is an anaerobic process which releases hydrogen sulfide gas (having a characteristic rotten-egg odor), such a subsurface operation may be preferred if the soil to be remediated is in or near to a populated area. Under such circumstances, if the contaminated soil is found below the surface (and the top layer of soil may thus be free of hexavalent chromium), the method may comprise removing a top layer of soil which is free of Cr(VI) (about 30 cm, for example) from the area, thereby creating an artificial depression. The soil is sampled, as described previously, and the void space and volume of soil to be treated are determined, as well as the concentration of hexavalent chromium in the contaminated soil and the pH of the soil. As previously described, the reaction amount of reducing agent may be calculated, and the depth of reducing agent (and activation agent if necessary) may be calculated based on the reaction amount of reduction and activation agents and the surface area of the soil in the artificial depression.

Following the wetting of the soil, as previously described, the calculated amount of chemical reducing agent and BNR sludge or other biological reducing agent (and activation agent, if desired) may be spread directly in the depression and flushed with water, without the need for providing a frame to contain the reducing agent. The layer of top soil which was removed may then be replaced over the top surface of the soil, and a recycling/recirculating method as previously described may be performed, if desired. Alternatively, if the top layer of soil is contaminated, a layer of clean soil free of hexavalent chromium (such as to a depth of about 30 cm) may be provided on top of the surface of the contaminated soil after applying the reducing agent and flushing with water. In both cases, the presence of a clean layer of soil that is free of hexavalent chromium and the microbial activities which occur therein will act as a biofilter to help remove odor-causing byproducts which may arise, and will make the remediation site less distasteful. Such a top layer may be seeded with grass or planted with trees, if desired.

The methods of site remediation via recirculation, either by installation of recovery wells or in a hydraulically isolated area, are highly advantageous. The results are greatly enhanced, which makes reduction of high concentrations of Cr(VI) to very low levels easily attainable. Furthermore, the costs of remediation are significantly reduced as the amounts of reducing agent which are needed are much lower. In highly contaminated sites, in which enormous quantities of reducing agent would be needed to provide an overdose of two to ten times the theoretical reduction demand, recirculation allows for the use of only a slight overdose of reducing agent.

Under some circumstances, it may be desirable to perform a purely biological reduction. Specifically, in some hydraulically isolated contaminated areas or in areas in which recovery wells have been constructed, it may not be necessary to add an initial amount of chemical reducing agent if the available biological reducing agent, such as return activated sludge, waste activated sludge, or leachate from groundfill or composting operations contains sufficient reducing agent. Typically, these waste products generally contain very strong mixed organic reducing agents. Under such circumstances, it may be determined upon sampling the soil, as described above, that the waste product has sufficient theoretical reduction power. In other words, it may be calculated by estimating the chemical oxygen demand (COD) of the waste product that a particular depth of the waste product may be able to achieve an overdose of the theoretical reduction demand. Accordingly, after a frame is provided on a top surface of the soil, as previously described, the soil may be wet and the particular depth of the waste product, as determined above, may be pumped from an aquifer below the soil, applied to the soil, and distributed into the frame. Additional water may then be added for about one day to about several days at any rate which is deemed appropriate based on the particular conditions to slowly dissolve the sludge and deliver it to the contaminated soil. The advantage to using such waste products as reducing agents is low cost: because they already contain reducing agent, there is no need to add any additional chemical or biological reducing agent to the soil during treatment.

There are several significant advantages to the methods of the present invention. Firstly, the methods utilize inexpensive, readily available materials, such as simple lumber may be used for building the frame, standard hoses may be used for applying the water, and the application of inexpensive reducing agents, such as ferrous sulfate and biological agents from beneficial use of municipal wastewater or treatment wastes. Furthermore, the manner in which the soil is prepared for treatment is straightforward and easy to accomplish without incurring significant expenses, such as those required when building reactors for ex-situ soil treatment. This invention further provides methods for the in-situ detoxification of soil and groundwater by reducing the hexavalent chromium without excavation or the need for mechanical mixing. The use of the frame provides a way to dissolve bulk granular reagents for direct delivery by gravity without the need to prepare solutions. Finally, the use of surfactants to wet the soil and reduce the surface tension provides a better and more uniform contact between the reagents and contaminants. Such methods fulfill a need for safe, controllable, easy methods of chromium reduction which can be accomplished on a large scale and which are environmentally advantageous. The advantages outlined above make the methods feasible on large contaminated sites without significant costs. The methods are effective in reducing the amount of hexavalent chromium to extremely low levels. Finally, the methods allow for the use of return activated sludge or wastewater as a source for the reducing agent, which further reduces the cost of soil remediation. This is especially important in highly contaminated areas as it further serves to reduce the cost of treatment.

In addition to providing methods for the in-situ reduction of Cr(VI), this invention also provides a system for the reduction of hexavalent chromium in contaminated soil. As shown in FIGS. 1 and 2A and described previously, the system includes a frame 8 open at a top 20 and a bottom 18 configured to retain water and a reaction amount of a reducing agent capable of reducing hexavalent chromium to trivalent chromium, as described previously. As shown in FIG. 2A and described previously, the system further includes a hose 38 positioned with respect to the frame 8 such that water can be provided through the top and bottom of the frame 8, a spreader 50 capable of delivering a reaction amount of a reducing agent to the frame, and a water source 36. Such an inexpensive system containing readily available components is useful for the in situ reduction of Cr(VI) to Cr(III).

This invention will now be described in more detail with respect to the following non-limiting examples:

EXAMPLE 1

Bench-scale tests were used to evaluate the viability of using domestic wastewater treatment biological nutrient removal (BNR) sludge and a chemical reducing agent (ferrous sulfate) to reduce hexavalent chromium to trivalent chromium. For these tests, soil samples were collected from the Patapsco Waste Water Treatment Plant (WWTP). The soil samples were sieved and rinsed, and debris, including pebbles, brick pieces, metal, wood, etc., was removed. The soil samples were then spiked with potassium dichromate and about 300 mL of the spiked soil samples were packed into 500 mL disposable filtration units (Cole Palmer Catalog No. A-06730-54). Two levels of spiked potassium dichromate soils were used: a higher level ("Spiked High") containing about 450 mg/Kg of hexavalent chromium (or about 300 mg in each filtration unit), and a lower level ("Spiked Low") containing about 150 mg/Kg of hexavalent chromium (or about 100 mg in each filtration unit).

Following the application of the appropriate reducing agent, as described below, tap water (200 mL) was poured on top of each filtration system. After the water had completely flowed through the system, the effluent water was poured back on the top portion of the system to simulate a pump. This process was repeated throughout the day with single run times ranging from five minutes to six hours. Except for a few slow flowing systems, test runs were paused during lunch hours, after office hours, and during weekends. Vacuums were created within the system using latex gloves to prevent water flow, thereby pausing the system. During weekends, the systems were run for approximately two hours on both Saturday and Sunday. Conditions were run for a minimum of eight days. Effluent samples, each 5 mL, were typically taken on the first, second, fourth, and eighth days of the test runs. At the end of the runs, the soil samples were taken out of the filtration unit and analyzed as follows. Each 5 mL sample was diluted with 100 mL of water and the diluted samples were tested for hexavalent chromium and occasionally, total chromium.

Three different remediation approaches were taken in order to convert the hexavalent chromium to trivalent chromium: (1) using purely chemical reduction; (2) using purely biological reduction; and using a combination of chemical and biological reductions.

Chemical Reduction Method

The chemical reduction method involved adding dry ferrous oxide (about 8 g) directly into the contaminated soil and stirring it in to simulate a tiller. The chemical reaction between the potassium dichromate in the soil and the added ferrous sulfate resulted in a drop in the pH of the system. Two conditions were tested, one using only ferrous sulfate and a second in which lime was included to maintain a pH level above 8. The results of the chemical reduction are shown in Table 1 below:

TABLE 1

| Test Condition | Cr (VI) (mg/L) in Filtrate | | pH |
| | Day One | Day Nine | Day Nine |
| --- | --- | --- | --- |
| Control, Spiked High | 956 | 1,008 | 7 |
| $FeSO_4$ alone, Spiked High | N.D. | N.D. | 4 |
| $FeSO_4$ w. Lime, Spiked High | 1,260 | 1.1 | 12.5 |
| Control, Spiked Low | 210 | 250 | 7 |
| $FeSO_4$ alone, Spiked Low | N.D. | — | 4 |

Note:
N.D. = not detected; detection limit is 0.05 mg/L for hexavalent chromium

Biological Reduction

The second remedial method, using purely biological reduction, involved adding about 60 g of BNR sludge cakes, collected from Back River WWTP of Baltimore, Md., on top of the contaminated soil. Three different conditions were tested in this method: (1) sludge alone; (2) sludge and a carbon food source; and (3) a combination of sludge, a carbon food source, and lime (to maintain pH above 7). Although it was found that the sludge alone had the ability to convert hexavalent chromium to trivalent chromium, the reducing rate was slow. Accordingly, to increase the remediation rate, a carbon food source (one tablespoon or about 12 mL of syrup) was added and mixed into the sludge. During the biological activity, the pH of the system dropped from an ideal 7 to an acidic 4.5. To counter this change, seven tablespoons (about 80 mL) of lime were added and mixed into the sludge, thus raising the pH back to 7. The results of biological reduction under the three conditions are shown in Table 2 below:

TABLE 2

| | Cr (VI) (mg/L) in Filtrate | | pH |
|---|---|---|---|
| Test Condition | Day One | Day Nine | Day Nine |
| Control, Spiked High | 956 | 1,008 | 7 |
| Sludge alone, Spiked High | 735 | 420 | 7.5 |
| Control, Spiked Low | 210 | 250 | 7 |
| Sludge w. syrup, Spiked Low | N.D. | N.D. | 4.5 |

Note:
N.D. = not detected; detection limit is 0.05 mg/L for hexavalent chromium

Combination of Chemical and Biological Reduction

The third remedial method, a combination of chemical and biological reduction, utilized both ferrous oxide and BNR sludge to convert hexavalent chromium to trivalent chromium. In this method, components of the chemical and biological reduction methods, as previously described, were combined. The results of the combined chemical and biological reduction are shown in Table 3 below:

TABLE 3

| | Cr (VI) (mg/L) in Filtrate | | pH |
|---|---|---|---|
| Test Condition | Day One | Day Nine | Day Nine |
| Control, Spiked High | 956 | 1,008 | 7 |
| Sludge & FeSO$_4$, Spiked High | 189 | 147 | 6 |
| Sludge, syrup, lime, & FeSO$_4$, Spiked High | 14 | 27 | 6.5 |
| Control, Spiked Low | 210 | 250 | 7 |
| Sludge & FeSO$_4$, Spiked Low | N.D. | N.D. | 4.5 |
| Sludge, syrup, & FeSO$_4$, Spiked Low | N.D. | N.D. | 4.5 |

Note:
N.D. = not detected; detection limit is 0.05 mg/L for hexavalent chromium

From these results, it can be concluded that the best results of hexavalent chromium detoxification can be obtained using chemically assisted biological reduction. Although purely chemical (ferrous sulfate) treatment does reduce the hexavalent chromium in soils, such treatment often results in pH levels in an undesirable range (either too low at about 4 or too high at above 12). Additionally, based on these results, the upper contamination level of hexavalent chromium concentration in soils that can be reliably treated by the proposed method to achieve the stringent levels that meet the newly proposed level by the state of California appears to be about 150 to 450 mg/Kg.

EXAMPLE 2

A chromium tailing pile at the Pautuxent Waste Water Treatment Plant (WWTP) in Baltimore, Md. measuring approximately 100 m in length, 50 m in width, and 14 m in depth is required by the State of Maryland to be remediated to the standard of 5 mg/L chromium in TCLP. More than 200 samples have been taken from more than 60 borings and analyzed. The total chromium concentrations range from non-detect to 29,400 mg/Kg, and hexavalent chromium concentrations range from non-detect to 6,780 mg/Kg with the average estimated to be 200 mg/Kg. The EP Toxicity (a similar but early version of TCLP) chromium concentrations range from non-detect to 97 mg/L. The pH of the tailing ranges from 6.3 to 7.9, with the average being 6.9, and the average alkalinity exceeds 10,000 mg/Kg (mainly present as $CaCO_3$), so that it would be economically prohibitive to lower the soil pH with bulk acid. The specific gravity of the soil is 2.3.

The selected method of treatment for the pile is reduction with the waste activated sludge (WAS) available at the WWTP itself. The theoretical reduction power of the WAS is estimated using its chemical oxygen demand (COD), which is about 8,000 mg/L of $O_2$ (0.25 moles oxygen/L, or 1.0 equivalents/L). The WAS is estimated to be about 3% in solids and about 1.0 in density. The theoretical reduction demand of the contaminated tailing pile is estimated to be $6.087 \times 10^6$ g (117,000 moles or 351,000 equivalents to be reduced from hexavalent to trivalent chromium) as chromium and the reaction amount, accounting for a conservative overdose of 10 times, is calculated to be 3,510,000 L of WAS. Therefore, the depth of the WAS is preferably about 70 cm, and the height of the frame is desirably at least one meter.

The pile is prepared by mechanically (using a bulldozer, for example) leveling the top of the pile after clearing the trees and vegetation. A series of 50 square frames measuring 10 m in length, 10 m in width, and 1 m in depth are constructed of plywood such that each adjoins the next and such that the whole pile is covered. Walkways are constructed with plywood on top of the frames for maintenance. Garden soakers (e.g., U.S. Pat. No. 5,368,235) or hoses with small holes (less than 1 mm diameter evenly punched along the entire length of the hose) are arranged on the top surface inside of the frames in such a way that they are evenly distributed. The soakers or hoses are connected to a water supply and water flows at about 1 L/minute-m$^2$ for at least 24 hours to saturate the tailings. The water is turned off and Waste Activated Sludge from the WWTP is pumped and distributed into the frames so that each one is filled at about 70% of the depth with WAS. Water is turned back on at a rate to approximately maintain the head of the sludge inside the frames for seven days and then turned off. The sludge is allowed to sit until dried. Random core samples of treated tailings are taken with a Geoprobe and analyzed for hexavalent chromium concentrations. If any of the hexavalent chromium concentrations are found to exceed 80 mg/Kg, additional WAS is placed in the framed areas containing concentrations exceeding the desired limit. If all the hexavalent chromium concentrations are found to be within 80 mg/Kg, confirmation TCLP samples are taken to provide evidence that the cleanup goal has been reached. After the successful remediation has been demonstrated, the frames are removed, and the area is redeveloped or seeded with grass.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for the in-situ reduction of hexavalent chromium to trivalent chromium in soil comprising hexavalent chromium, comprising:

(a) sampling soil comprising hexavalent chromium to determine a reaction amount of a reducing agent;

(b) providing a frame on a top surface of the soil;

(c) wetting the soil in the frame;

(d) spreading a reducing agent on the top surface of the soil in the frame; and (e) flushing the soil in the frame with water to dissolve the reducing agent.

2. The method according to claim 1, wherein step (a) further comprises:

(i) obtaining a soil sample;

(ii) determining an amount of hexavalent chromium in the soil sample;

(ii) calculating a theoretical reduction demand; and (iii) determining the reaction amount of reduction agent to be used based on the theoretical reduction demand.

3. The method according to claim 1, wherein step (a) further comprises measuring a pH of the sampled soil.

4. The method according to claim 1, further comprising:

(f) sampling the flushed soil to determine the effectiveness of the treatment based on an amount of hexavalent chromium present in the flushed soil.

5. The method according to claim 4, further comprising repeating steps (c)–(e) if the amount of hexavalent chromium concentration is not sufficiently reduced.

6. The method according to claim 1, further comprising:

(g) providing a recovery well on a down gradient side of the frame; and (h) pumping water comprising the reducing agent from the recovery well below the soil and applying the pumped water to the soil.

7. The method according to claim 6, wherein the flushed soil after pumping has an amount of hexavalent chromium no greater than 5 mg/L.

8. The method according to claim 1, wherein the reducing agent is selected from the group consisting of ferrous salts, sulfide salts, sodium thiosulfate, sodium benzoate, and organic reducing agents.

9. The method according to claim 8, wherein the reducing agent is a ferrous salt selected from the group consisting of ferrous sulfate, ferrous chloride, and ferrous sulfite.

10. The method according to claim 8, wherein the reducing agent is a sulfide salt selected from the group consisting of sodium sulfide and potassium sulfide.

11. The method according to claim 8, wherein the reducing agent is an organic reducing agent selected from the group consisting of citric acid, methanol, ethanol, and formaldehyde.

12. The method according to claim 1, wherein the reducing agent is in solution.

13. The method according to claim 1, wherein the reducing agent is one of a powder or a fine granulate.

14. The method according to claim 13, further comprising dissolving the reducing agent in solution prior to spreading the reducing agent on top of the soil.

15. The method according to claim 1, further comprising tilling about 15 cm of depth of the soil and leveling the soil to produce a generally smooth surface prior to providing the frame in step (b).

16. The method according to claim 1, wherein the method further comprises calculating a void space of the soil before wetting the soil in step (c) and step (c) further comprises adding a quantity of water sufficient to fill the void spaces.

17. The method according to claim 1, wherein the height of the frame in step (b) is determined by the reaction amount of the reducing agent.

18. The method according to claim 1, wherein step (c) further comprises applying a surfactant to the soil.

19. The method according to claim 18, wherein the surfactant is a non-ionic surfactant selected from the group consisting of ethoxylates, alkyl phenol ethoxylates, and lauryl alcohols.

20. The method according to claim 1, wherein step (d) further comprises adding an activation agent with the reducing agent to adjust a pH of the soil.

21. The method according to claim 20, wherein the activation agent is one of a solution, a powder, or a fine granulate.

22. The method according to claim 20, wherein the activation agent is an acid selected from the group consisting of sulfuric acid, hydrochloric acid, nitric acid, and acetic acid.

23. The method according to claim 20, wherein the activation agent is a base selected from the group consisting of calcium oxide, calcium hydroxide, sodium hydroxide, sodium carbonate, and sodium bicarbonate.

24. The method according to claim 1, wherein the reducing agent is a biological agent.

25. The method according to claim 24, wherein the biological agent is sludge from wastewater.

26. The method according to claim 24, wherein the biological agent is return activated sludge.

27. The method according to claim 24, wherein the biological agent is leachate from landfill or from composting operations.

28. The method according to claim 24, wherein the biological agent is waste activated sludge.

29. The method according to claim 24, wherein the biological agent is compost material from municipal wastewater, industrial wastewater, or solid waste operations.

30. The method according to claim 1, wherein the soil treated by the method has an amount of hexavalent chromium no greater than 5 mg/L.

31. A method for the in-situ reduction of hexavalent chromium to trivalent chromium in soil comprising hexavalent chromium in a hydraulically isolated area comprising:

(a) sampling soil comprising hexavalent chromium to determine a reaction amount of a reducing agent;

(b) providing a frame on a top surface of the soil;

(c) wetting the soil in the frame;

(d) spreading a reducing agent on the top surface of the soil in the frame;

(e) flushing the soil in the frame with water to dissolve the reducing agent; and (f) pumping water comprising the reducing agent from an aquifer below the soil and applying the pumped water to the soil in the frame.

32. A method for the in-situ reduction of hexavalent chromium to trivalent chromium in soil comprising hexavalent chromium in a hydraulically isolated area, wherein the area comprises a contaminated waste product selected from the group consisting of return activated sludge and waste activated sludge, comprising:

(a) sampling soil comprising hexavalent chromium to determine a reaction amount of a reducing agent;

(b) calculating a reduction power of the contaminated waste product;

(c) providing a frame on a top surface of the soil;

(d) wetting the soil in the frame; and (e) pumping water comprising the contaminated waste product from an aquifer below the soil and applying the pumped water to the soil in the frame.

33. A method for the in-situ reduction of hexavalent chromium to trivalent chromium in groundwater comprising hexavalent chromium, comprising:

(a) sampling groundwater comprising hexavalent chromium to determine a reaction amount of a reducing agent;

(b) providing a frame on a top surface of the soil;

(c) providing a recovery well and a circulating means on a down gradient side of the frame;

(d) wetting the soil in the frame;

(e) spreading a reducing agent on the top surface of the soil in the frame;

(f) flushing the soil in the frame with water to dissolve the reducing agent; and (g) pumping water comprising the reducing agent from the recovery well below the soil and applying the pumped water to the soil in the frame.

34. The method according to claim 33, further comprising:

(h) sampling the groundwater after treatment to determine the effectiveness of the treatment based on an amount of hexavalent chromium present in the groundwater.

35. The method according to claim 34, further comprising repeating steps (e)–(g) if the amount of hexavalent chromium concentration is not sufficiently reduced.

36. The method according to claim 34, wherein the groundwater after pumping has an amount of hexavalent chromium no greater than 50 ppb.

37. A method for the in-situ reduction of hexavalent chromium to trivalent chromium in soil comprising hexavalent chromium, comprising:

(a) sampling soil comprising hexavalent chromium to determine a reaction amount of a reducing agent;

(b) providing a frame on a top surface of the soil;

(c) providing a recovery well and a circulating means on a down gradient side of the frame;

(d) wetting the soil in the frame;

(e) spreading a reducing agent on the top surface of the soil in the frame;

(f) flushing the soil in the frame with water to dissolve the reducing agent; and (g) pumping water comprising the reducing agent from the recovery well below the soil and applying the pumped water to the soil in the frame.

38. The method according to claim 37, further comprising:

(h) sampling the flushed soil after treatment to determine the effectiveness of the treatment based on an amount of hexavalent chromium present in the flushed soil.

39. The method according to claim 38, further comprising repeating steps (g) and (h) until the amount of hexavalent chromium concentration is sufficiently reduced.

40. The method according to claim 38, wherein the treated soil after pumping has an amount of hexavalent chromium no greater than 5 mg/L.

41. A method for the in-situ reduction of hexavalent chromium to trivalent chromium in soil comprising hexavalent chromium, comprising:

(a) sampling soil comprising hexavalent chromium to determine a reaction amount of a reducing agent;

(b) providing a frame on a top surface of the soil;

(c) wetting the soil in the frame;

(d) spreading a reducing agent on the top surface of the soil in the frame;

(e) flushing the soil in the frame with water to dissolve the reducing agent; and (f) covering the top surface or the soil in the frame with a layer of clean soil free of hexavalent chromium.

42. The method according to claim 41, wherein the soil comprising hexavalent chromium to be reduced comprises a top layer which is free of hexavalent chromium, and the method further comprises removing the top layer of the soil which is free of hexavalent chromium before stop (c); and step (f) further comprises using the removed top layer of the soil as the layer of clean soil in step (f).

* * * * *